A. G. HERRESHOFF.
TRANSMISSION FOR AUTOMOBILES.
APPLICATION FILED JULY 6, 1917.

1,242,803.

Patented Oct. 9, 1917.
2 SHEETS—SHEET 1.

INVENTOR
Alexander G. Herreshoff
BY
Redding Greeley Bartlett
ATTORNEYS

WITNESS:
Geo K Merz

A. G. HERRESHOFF.
TRANSMISSION FOR AUTOMOBILES.
APPLICATION FILED JULY 6, 1917.

1,242,803.

Patented Oct. 9, 1917.
2 SHEETS—SHEET 2.

WITNESS:

INVENTOR
Alexander G. Herreshoff
BY
ATTORNEYS

UNITED STATES PATENT OFFICE.

ALEXANDER GRISWOLD HERRESHOFF, OF NEW YORK, N. Y., ASSIGNOR TO INTERNATIONAL MOTOR COMPANY, OF NEW YORK, N. Y., A CORPORATION OF DELAWARE.

TRANSMISSION FOR AUTOMOBILES.

1,242,803.     Specification of Letters Patent.     Patented Oct. 9, 1917.

Application filed July 6, 1917. Serial No. 178,908.

*To all whom it may concern:*

Be it known that I, ALEXANDER GRISWOLD HERRESHOFF, a citizen of the United States, residing in the borough of Manhattan of the city of New York, in the State of New York, have invented certain new and useful Improvements in Transmissions for Automobiles, of which the following is a specification, reference being had to the accompanying drawings, forming a part hereof.

This invention relates to transmissions for automobiles and is concerned particularly with the rear axle construction and the driving elements incorporated therein whereby there is secured between the propeller shaft and the axle section a reduction of speed in addition to the usual gear reduction obtained in the transmission housing. In accordance with the invention, the elements are arranged in a more simple and compact relation to each other than has heretofore been possible where a double reduction drive has been associated with the differential. A further object of the invention is to provide an improved housing on the rear axle for the double reduction gearing which housing caries a detachable cap in which are journaled certain elements of the transmission wall. In addition to this cap there is an independent removable section in which are journaled certain other elements removable as a unit with the cap. The details of the invention will appear in connection with the following description of the accompanying drawings, in which—

The truck $a$ is provided with a housing $b$ for the transmission gearing from which the drive is transmitted to the traction wheels $c$ through a propeller shaft $d$ extending to the rear axle. The rear end of the propeller shaft carries a flanged coupling $d'$ bolted to a corresponding flanged coupling member $e$ on the front end of a stub shaft $e'$ of a driving bevel pinion $e^2$, the end bearing $e^3$ of which may be formed with the section $h$ of the differential housing. The bevel pinion $e^2$ meshes with a large bevel gear $g$, which is also mounted on a short shaft $g'$ extending transversely of the cap $f$ of the differential housing and provided with roller bearings $g^2$ mounted on roller races $g^3$ supported on a separate detachable section $h$ resting on the main differential housing $i$. On the same shaft $g'$ with the large bevel gear $g$ is formed a spur pinion $g^4$ in mesh with a large spur gear $k$ formed on the spider $k'$ of the differential proper, this spider being provided with the smaller bevel pinions $k^2$ which are in constant mesh with bevel gears $l$ on the ends of the axle sections $m$. This differential operates in a manner well known. The frame $k'$ for the differential has its ends extended, as at $k^3$ and shouldered to receive roller bearings $k^4$ which run on roller races supported within the casing.

Figure 1:
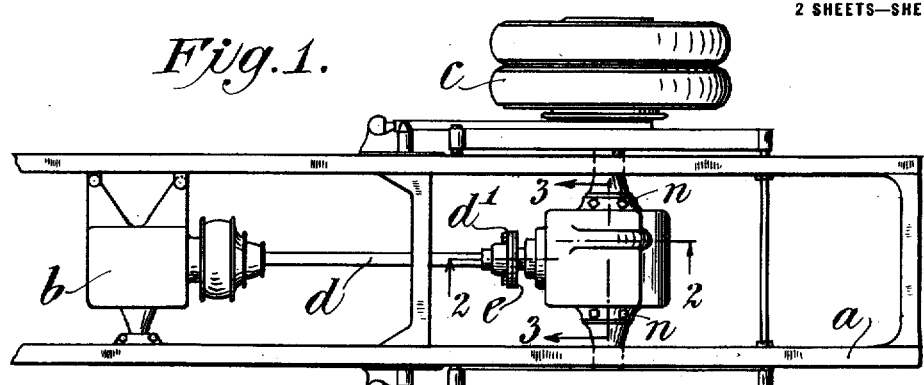
Figure 1 is a conventional view in plan of a fragment of a motor truck having a rear axle drive embodying the improvements.
Figure 2:
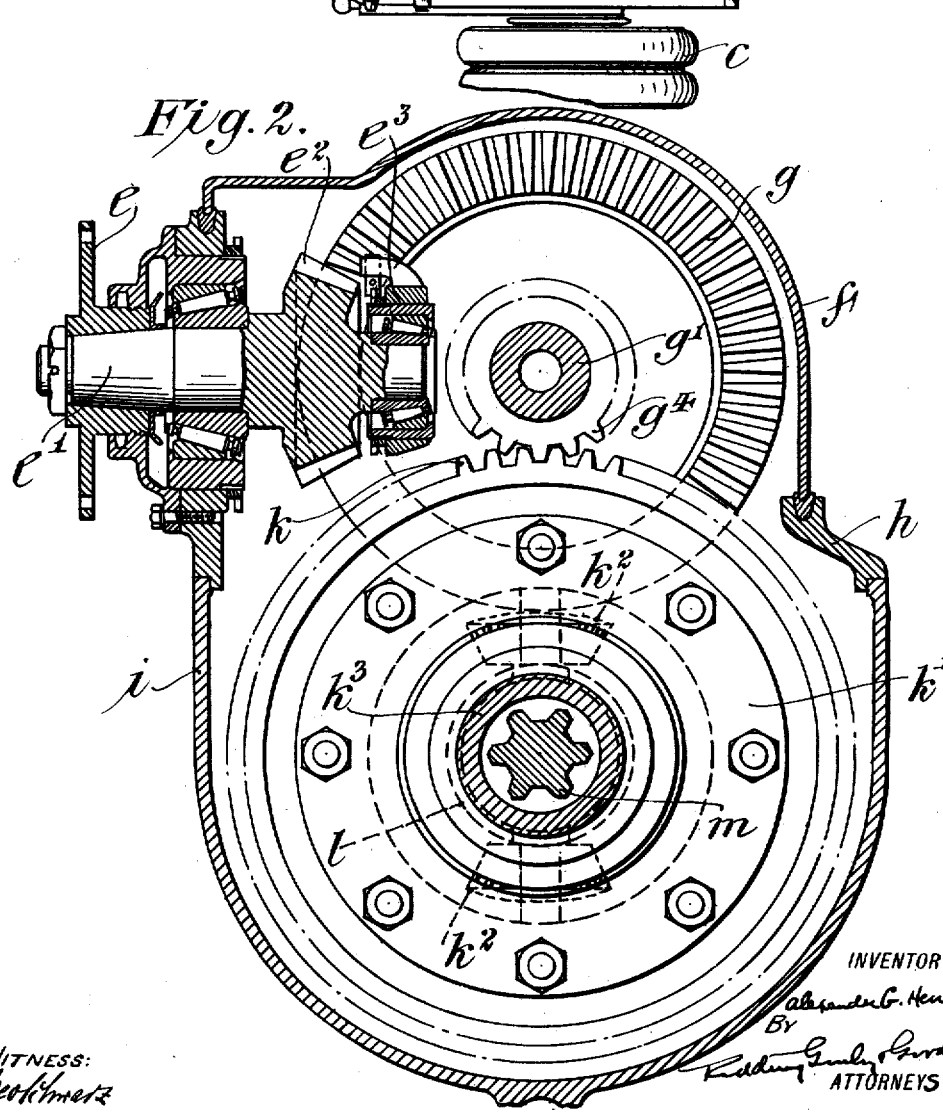
Fig. 2 is an enlarged detail view in transverse section taken through the rear axle of the truck shown in Fig. 1 and on the plane indicated by the line 2—2 of Fig. 1 and looking in the direction of the arrows.
Figure 3:
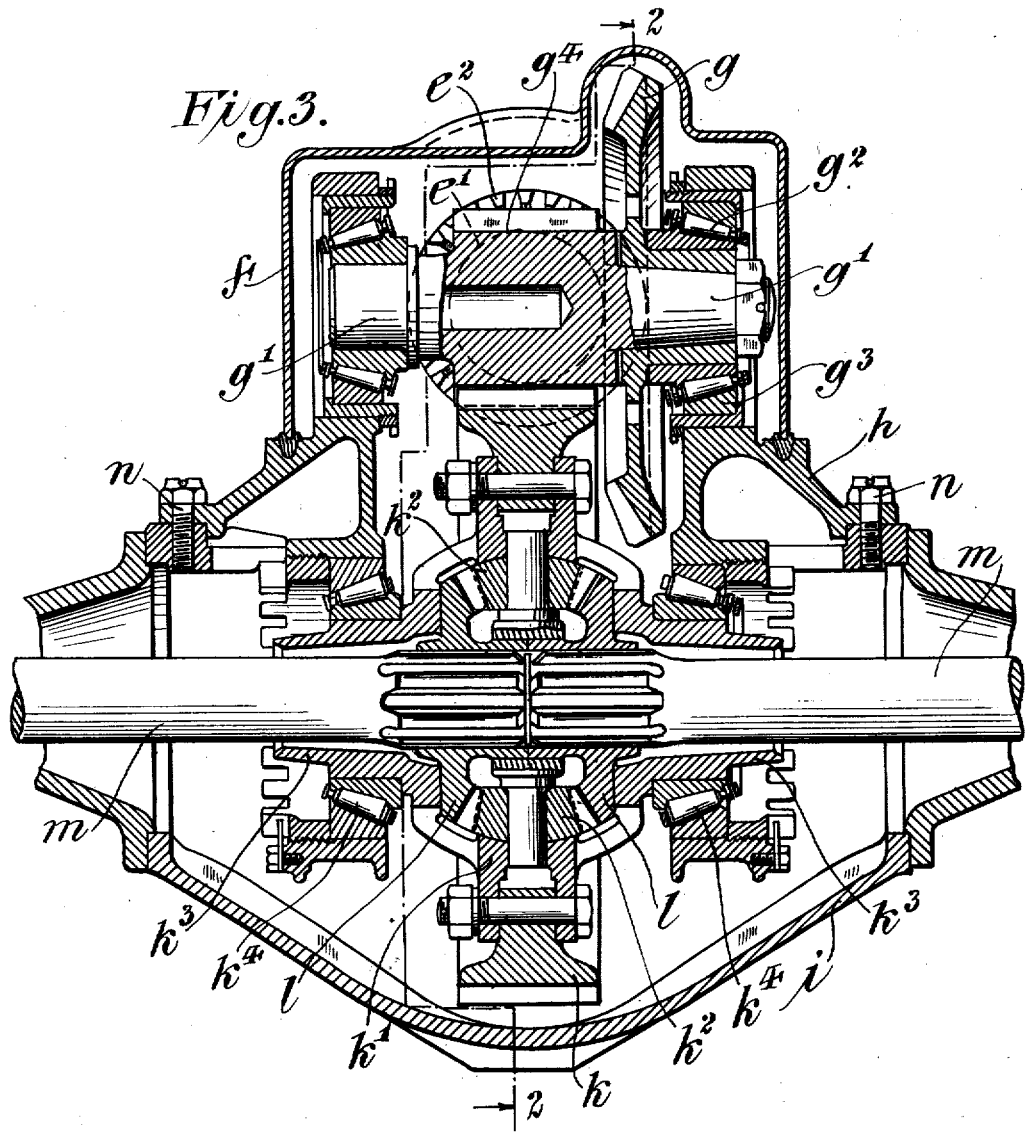
Fig. 3 is a detail view in section taken along the plane indicated by the line 3—3 of Fig. 1 and looking in the direction of the arrows.

By the construction described it will be evident that the power transmitted through the shaft $d$ is given a double reduction by the engagement of the bevel pinion $e^2$ with the larger bevel gear $g$ and the subsequent reduction between the spur gear $g^4$ and the master gear $k$ of the differential. It will also be evident that this reduction and arrangement of gears are such as to insure the greatest possible simplicity and compactness. One of the principal features of the invention has to do with the construction of the cap sections $f$, $h$, carried on the housing $i$ and the arrangement of bearings within these cap sections, whereby it becomes possible to remove as units one or more of the driving pinions and their bearings without disturbing any of the other parts. This accessibility for inspection and repair is of great importance in a construction in which there is employed a great number of driving parts. For instance, referring to Fig. 3, it will be evident that when the cap section $f$ is removed, the bevel pinion $e^2$, gear $g$ and spur gear $g^4$ are all exposed to view and readily accessible and yet none of these parts are disturbed. When the primary reduction gears, including the bevel pinion $e^2$, bevel gear $g$ and spur pinion $g^4$, are to be removed to facilitate accessibility to the master gear and its parts, it will be quite evident that the supporting races $g^3$ may be removed from their resting places on the intermediate cap section $h$. If desired, the shaft $g'$ and associated elements may be removed as a unit without disturbing the differential by removing the bolts $n$ and taking off the two upper cap sections $f$, $h$, together. This ready demountability is very desirable where it is necessary to obtain access to the differential, and by mounting the bearings for the first reduction elements wholly within this detachable unitary cap section, the amount of labor involved in disassembling the parts, as described, is materially reduced.

The structural features emphasized herein are made the subject matter of the appended claims to which attention is directed for an understanding of the invention.

I claim as my invention:

1. In an automobile transmission, in combination with the propeller shaft and differential, a housing for the differential, a beveled pinion on the end of the propeller shaft, a beveled gear journaled in the housing, a spur pinion carried with the beveled gear, and a spur gear on the differential enmeshed with the spur pinion.

2. In an automobile transmission, in combination with the propeller shaft and differential, a housing for the differential, a removable cap on the housing, a beveled pinion on the end of the propeller shaft journaled in the casing, a beveled gear journaled in the cap, a spur pinion carried with the beveled gear, and a spur gear on the differential enmeshed with the spur pinion.

3. In an automobile transmission, in combination with the propeller shaft and differential, a housing for the differential split along a horizontal plane, a cap detachably secured to the housing, a beveled pinion on the end of the propeller shaft journaled in the housing, a beveled gear journaled in the cap, a spur pinion carried with the beveled gear, and a spur gear on the differential enmeshed with the spur pinion.

4. In an automobile transmission, in combination with the propeller shaft and differential, a housing for the differential split along a horizontal plane, a detachable cap for the housing formed in two sections, a beveled pinion on the end of the propeller shaft journaled in one of said sections, a beveled gear journaled in the other of said sections, a spur pinion carried with the beveled gear, and a spur gear on the differential enmeshed with the spur pinion.

5. In an automobile transmission, in combination with the propeller shaft, axle sections and differential, a housing split along a horizontal plane in which the differential is journaled, a detachable cap carried on the housing, a beveled pinion on the end of the propeller shaft journaled in the cap, a beveled gear meshed with the beveled pinion, a stub shaft on which the beveled gear is carried journaled in the cap, a spur pinion formed on the stub shaft, and a spur gear on the differential enmeshed with the spur pinion.

This specification signed this 3d day of July, A. D. 1917.

ALEXANDER GRISWOLD HERRESHOFF.